Figure 3:
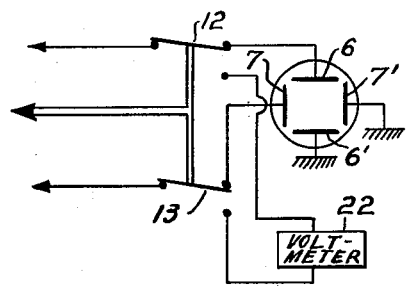

June 14, 1949.　　　　K. POSTHUMUS　　　　2,473,491

DIRECTION FINDING DEVICE

Filed Feb. 8, 1947

INVENTOR
KLAAS POSTHUMUS
BY Fred M Vogel
AGENT

Patented June 14, 1949

2,473,491

UNITED STATES PATENT OFFICE 2,473,491

DIRECTION FINDING DEVICE

Klaas Posthumus, Eindhoven, Netherlands, assignor to Hartford National Bank and Trust Company, Hartford, Conn., as trustee Application February 8, 1947, Serial No. 727,403
In the Netherlands February 26, 1944

Section 1, Public Law 690, August 8, 1946
Patent expires February 26, 1964

4 Claims. (Cl. 343—120)

This invention relates to a direction finding device, in which use is made of two equal, directional aerial systems placed at an angle and connected, via separate receivers, to an indicating device, for example, to deflecting electrodes of a cathode-ray tube which are placed at the same angle as the aerials.

In such a direction finding device comprising a cathode-ray tube the screen of the cathode-ray tube shows a line whose direction corresponds to the direction of the transmitter to be found. It is essential in this case that the amplification and the phase displacement in the two receivers should be exactly equal, since, if the amplification in the two channels were different, the direction of the line on the screen would not correspond to the direction of the course and in the case of unequal phase displacement an elliptic figure would ensue, which hampers the correct reading of the direction of the course.

It is therefore necessary to control the equality of amplification and phase displacement of the two receivers in taking bearings. The common means for this purpose consist in supplying equal voltages to the two receivers, since, if the voltages in the input circuits of the two receivers with equal amplification and phase displacement are equal to one another, the screen of the cathode-ray tube shows a line which is at equal angles with the two deflecting devices. If the amplification and/or the phase displacement are unequal, the amplification and/or the phase displacement of at least one of the receivers can be readjusted until such a line appears on the screen of the cathode-ray tube.

To supply equal voltages to the receivers, it is common to make use of an oscillator which can be connected to the input circuits of the two receivers. It has also been proposed to provide a switch which permits the input circuits of the two receivers to be connected in parallel with one or with the two aerials, so that the signals received in these aerials and originating from the station to be found are supplied to the two receivers.

These known means to control the equality of the amplification and phase-displacement of the two receivers have, however, the disadvantage that the process of taking bearings must be interrupted, whilst during this operation there is no certainty whether the indicating device indicates the correct direction.

The object of the invention is to procure means which permit a constant control of the equality of the two receivers also in taking the bearings.

According to the invention this is achieved by connecting the receivers periodically and alternately either each of them to one aerial or both to the same source of potential, preferably at least one aerial.

The device according to the invention procures two alternating indications during each period of the change-over frequency, one of them indicating the direction of the station to be found, the other being determined by the ratio of the phase displacement and the degree of amplification of the two receivers. A divergence from the equality of the two receivers, which can immediately be ascertained by means of the indication representing the ratio of phase displacement and degree of amplification of the receivers, can be corrected by readjusting the amplification and/or phase displacement of one of the receivers until the desired indication pertaining to equal amplification and phase displacement appears.

In order that the two indications may be easily distinguished from each other, an auxiliary indicating device is preferably provided and the output circuits of the two receivers are alternately connected to the two indicating devices by means of switching means operating in synchronism with the aerial change-over device.

In order that the invention may be clearly understood and readily carried into effect, it will now be explained more fully with reference to the accompanying drawings.

Figure 1:
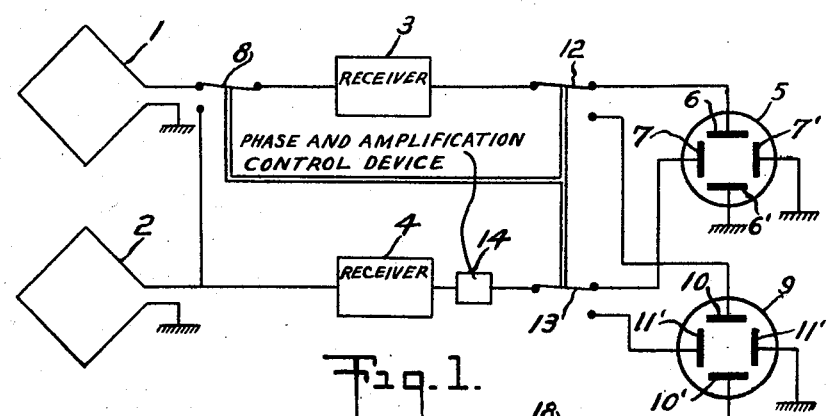
Figure 2:
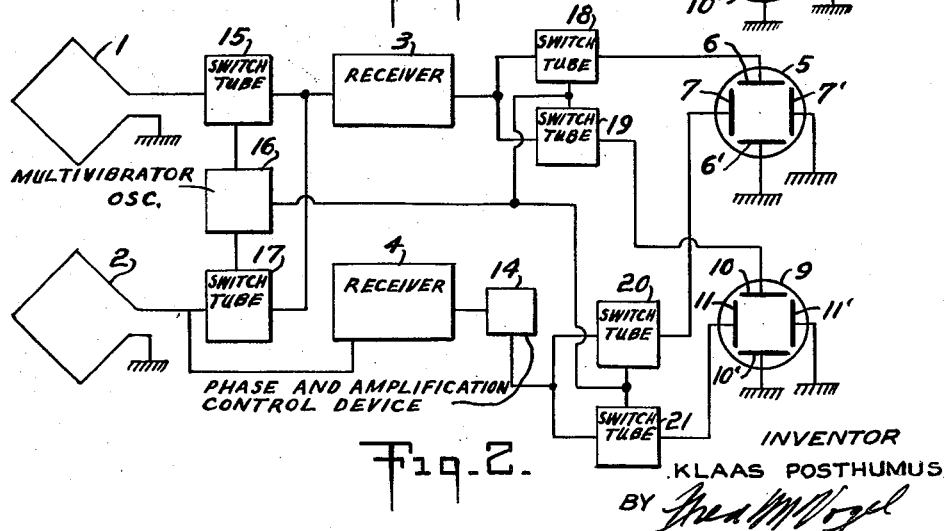

Figure 1 shows an embodiment of the invention;

Fig. 2 indicates a further embodiment of the invention employing a modified structure; and Fig. 3 indicates a portion of the system shown in Fig. 1 with a modified structure.

Figure 1 shows two equal loop antennae 1 and 2 placed at right angles to each other and connected to receivers 3 and 4. The voltages produced in the output circuits of the receivers are supplied to an indicating device which, in the form of construction shown, is constituted by a cathode-ray tube 5 provided with two deflecting devices normal to each other. The voltages supplied by the receivers 3 and 4 are supplied to the deflecting devices constituted by the pairs of plates 6, 6' and 7, 7' respectively, due to which the screen of the cathode-ray tube shows a straight line whose direction corresponds to the direction of the transmitter to be found, if the oscillations picked up by the aerials 1 and 2 are subject to the same amplification and phase displacement in the transmission circuits between aerial and deflecting device.

To permit constant control of the equality of the two receivers in taking bearings a switch 8 is provided which periodically connects the input circuit of the receiver 3 to the aerials 1 and 2, so that the receivers 3 and 4 are alternately connected either each of them to one of the aerials 1 and 2, or both to the aerial 2, and during each period of the change-over frequency a voltage dependent on the direction of the transmitter to be found and a control voltage, which is equal for the two receivers, are supplied to the receivers. In the form of construction shown the control voltage originates from the aerial 2. If desired, this voltage may be obtained from the aerials 1 and 2 connected in parallel or from a separate source of potential.

Fig. 2 shows the possibility of making use of discharge tubes 15 and 17 operating as switches. For example, each of the channels 1—3 and 2—3 respectively may include amplifying tube, the two tubes being alternately made conductive and blocked by means of the sinusoidal or impulse-shaped voltage generated by the oscillator.

In addition, in Figs. 1 and 2, an auxiliary indicating device 9 is provided which is similar to the indicating device 5 and which consequently comprises two pairs of plates 10, 10' and 11, 11' normal to each other. The output circuits of the receivers 3 and 4 are alternately connected either to the pairs of plates 6, 6' and 7, 7' of the device 5 or to the pairs of plates 10, 10' and 11, 11' of the auxiliary indicating device 9 by means of switches 12 and 13 or switching tubes 18, 19 and 20, 21, operating in synchronism with the aerial change-over device.

The transmission circuit between the aerial 2 and the pair of plates 7, 7' of the device 5 and 11, 11' respectively of the auxiliary indicator 9 includes a device 14 which permits the phase displacement and the degree of amplification of the receiver 4 to be controlled.

In the position of the switches 8, 12, 13 shown in Fig. 1, the signals picked up in the aerials 1 and 2 are supplied to the deflection plates 6, 6' and 7, 7' respectively through the receivers 3 and 4 respectively. In the other position of the switch 8 the signal picked up in the aerial 2 is supplied to the two receivers, whilst the output circuits of these receivers are connected to the auxiliary indicating device 9. Thus two figures ensue alternately one on the screen of the cathode-ray tube 5 which indicates the direction of the transmitter to be found, the other on the screen of the auxiliary indicator 9. In the case of equality of the two receivers the screen of the auxiliary indicator 9 shows a line which is at an angle of 45° with the two deflecting devices. However, if the amplification and the phase displacement of the two receivers are not equal to each other, the screen of the auxiliary indicator 9 shows a figure which can be developed again to a line forming an angle of 45° with the deflecting devices by adjustment of the device 14 which controls the phase displacement and amplification of the receiver 4. In this manner continued control is exercised in taking bearings.

In conjunction with the inertia (time of after glow) of the indicating devices 5 and 9, the frequency of the switches 8, 12 and 13 is preferably chosen in such a manner that the figures on the screen of the devices 5 and 9 are constantly visible.

Since the output voltages of the receivers 3 and 4, with a correct adjustment of the device 14 in the control position of the switch 8, are equal to each other and in phase, an auxiliary indicating device, as shown in Fig. 3, for example a voltmeter 22, may be used. In this case the adjustment of the device 14 required in the case of unequal amplification and phase displacement of the receivers can take place by controlling the phase displacement of the receiver 4 until the deflection of the voltmeter 22 indicates a minimum, after which the amplification of the receiver 4 can be controlled until the two voltages originating from the receivers neutralize each other and the voltmeter shows no deflection.

What I claim is:

1. A direction finding arrangement comprising first and second antenna having crossed directive patterns, first and second radio receivers, means to switch at a predetermined rate the first receiver input to the first antenna and in parallel with the input of the said second receiver selectively, means to couple the second receiver to the second antenna, means to vary the signal amplitude and signal phase response of one of said receivers, a cathode ray indicator having noncoplanar deflecting electrodes, an auxiliary voltage indicating means, and means to switch at the said predetermined rate the output of said receivers to the respective noncoplanar deflecting electrodes of said cathode ray indicator and to the auxiliary indicating means selectively.

2. In a direction finding arrangement, the combination of a first and second antenna having directive patterns crossed at a given angle, first and second radio receivers, means to switch at a predetermined rate the first receiver input to the first and second antennae selectively, means to couple the second receiver to one of the antennae, means to vary the signal amplitude and signal phase response of one of said receivers, a cathode ray indicator having deflecting electrodes at a plane angle equal to the said given angle of the directive patterns, an auxiliary voltage indicating means, and means to switch at the said predetermined rate the output of said receivers to the respective deflecting electrodes of said cathode ray indicator and to the auxiliary indicating means selectively.

3. A direction finding arrangement comprising first and second antennae having directive patterns crossed at given angles, first and second radio receivers, means to switch at a predetermined time rate the first receiver input to the first and second antennae selectively, means to couple the second receiver to one of the antennae, means to vary the signal amplitude and signal phase response of one of said receivers, a cathode ray indicator having noncoplanar deflecting electrodes and a persistence greater in time than the said switching time rate, an auxiliary voltage indicating means, and means to switch at the said predetermined rate the output of said receivers to the respective noncoplanar deflecting electrodes of said cathode ray indicator and to the auxiliary indicating means selectively.

4. A radio direction finding device comprising first and second antennae having crossed directive patterns, first and second radio receivers, means to switch at a predetermined rate the first receiver input to the first and second antennae selectively, means to couple the second receiver to one of the antennae, means to vary the signal amplitude and signal phase response of one of said receivers, a first cathode ray indicator having noncoplanar deflecting electrodes, a second cathode ray indicator having deflecting electrodes, and means to switch at the said predetermined rate the output of said receivers to the respective deflecting electrodes of said first and second cathode ray indicator selectively.

KLAAS POSTHUMUS.

REFERENCES CITED

The following references are of record in the file of this patent:

UNITED STATES PATENTS

| Number | Name | Date |
|---|---|---|
| 2,192,581 | Schulz | Mar. 5, 1940 |

FOREIGN PATENTS

| Number | Country | Date |
|---|---|---|
| 504,253 | Great Britain | Apr. 21, 1939 |
| 553,618 | Great Britain | May 28, 1943 |

OTHER REFERENCES

Electronics, April 1939, The Industry in Review, by V. P. Taylor, pp. 62, 63, 64 and 65.